United States Patent
Keene et al.

(10) Patent No.: US 11,830,988 B2
(45) Date of Patent: Nov. 28, 2023

(54) STATE-OF-HEALTH BALANCED BATTERY MANAGEMENT SYSTEM

(71) Applicant: ENEVATE CORPORATION, Irvine, CA (US)

(72) Inventors: Samuel Keene, Irvine, CA (US); Benjamin Yong Park, Mission Viejo, CA (US)

(73) Assignee: ENEVATE CORPORATION, Irvine, CA (US)

( * ) Notice: Subject to any disclaimer, the term of this patent is extended or adjusted under 35 U.S.C. 154(b) by 0 days.

(21) Appl. No.: 17/548,851

(22) Filed: Dec. 13, 2021

(65) Prior Publication Data

US 2023/0187711 A1    Jun. 15, 2023

(51) Int. Cl.
*H01M 10/42* (2006.01)
*H01M 10/0525* (2010.01)

(52) U.S. Cl.
CPC ..... *H01M 10/425* (2013.01); *H01M 10/0525* (2013.01); *H01M 2010/4271* (2013.01)

(58) Field of Classification Search
CPC ........... H01M 10/425; H01M 10/0525; H01M 2010/4271
USPC .......................................................... 429/7
See application file for complete search history.

(56) References Cited

U.S. PATENT DOCUMENTS

2015/0280290 A1* 10/2015 Saha ................... H01M 10/425 324/426
2018/0287219 A1* 10/2018 Sood ...................... G01N 29/26
2021/0141028 A1* 5/2021 Du ...................... G01R 31/3648

OTHER PUBLICATIONS

Jichao Hong, et al., "Online accurate state of health estimation for battery systems on real-world electric vehicles with variable driving conditions considered", Journal of Cleaner Production, Jan. 6, 2021, 16 pages.
Xiong Feng, et al., "State-of-charge estimation of lithium-ion battery based on clockwork recurrent neural network", Energy, Jul. 3, 2021, 10 pages.
Yihuan Li, et al., "Lithium-ion battery capacity estimation—A pruned convolutional neural network approach assisted with transfer learning", Applied Energy, Jan. 4, 2021, 13 pages.
Kodjo S.R. Mawonou, Akram Eddahech, Didier Dumur, Dominique Beauvois, Emmanuel Godoy. "State-of-health estimators coupled to a random forest approach for lithium-ion battery aging factor ranking", Journal of Power Sources, Elsevier, Jan. 10, 2021, 28 pages.

* cited by examiner

*Primary Examiner* — Gary D Harris
(74) *Attorney, Agent, or Firm* — McAndrews, Held & Malloy, Ltd.

(57) ABSTRACT

Systems and methods are provided for state-of-health balanced battery management system. State-of-health (SOH) of one or more lithium-ion cells may be assessed, and based on the assessing of state-of-health (SOH), the one or more lithium-ion cells may be controlled. The controlling may include setting or modifying one or more operating parameters of at least one lithium-ion cell, and the controlling may be configured to equilibrate the state-of-health (SOH) of the one or more lithium-ion cells or to modify a state-of-health (SOH) of at least one lithium-ion cell so that the one or more lithium-ion cells have a uniform state-of-health (SOH).

30 Claims, 8 Drawing Sheets

STATE-OF-HEALTH BALANCED BATTERY MANAGEMENT SYSTEM

REFERENCE

This patent application also makes reference to:
U.S. patent application Ser. No. 17/548,830, filed on even date herewith; and
U.S. patent application Ser. No. 17/548,845, filed on even date herewith.

Each of the above identified applications is hereby incorporated herein by reference in its entirety.

TECHNICAL FIELD

Aspects of the present disclosure relate to energy generation and storage. More specifically, certain implementations of the present disclosure relate to methods and systems for a state-of-health balanced battery management system.

BACKGROUND

Various issues may exist with conventional battery technologies. In this regard, conventional systems and methods, if any existed, for designing and producing batteries or components thereof may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

System and methods are provided for state-of-health balanced battery management system, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1A:
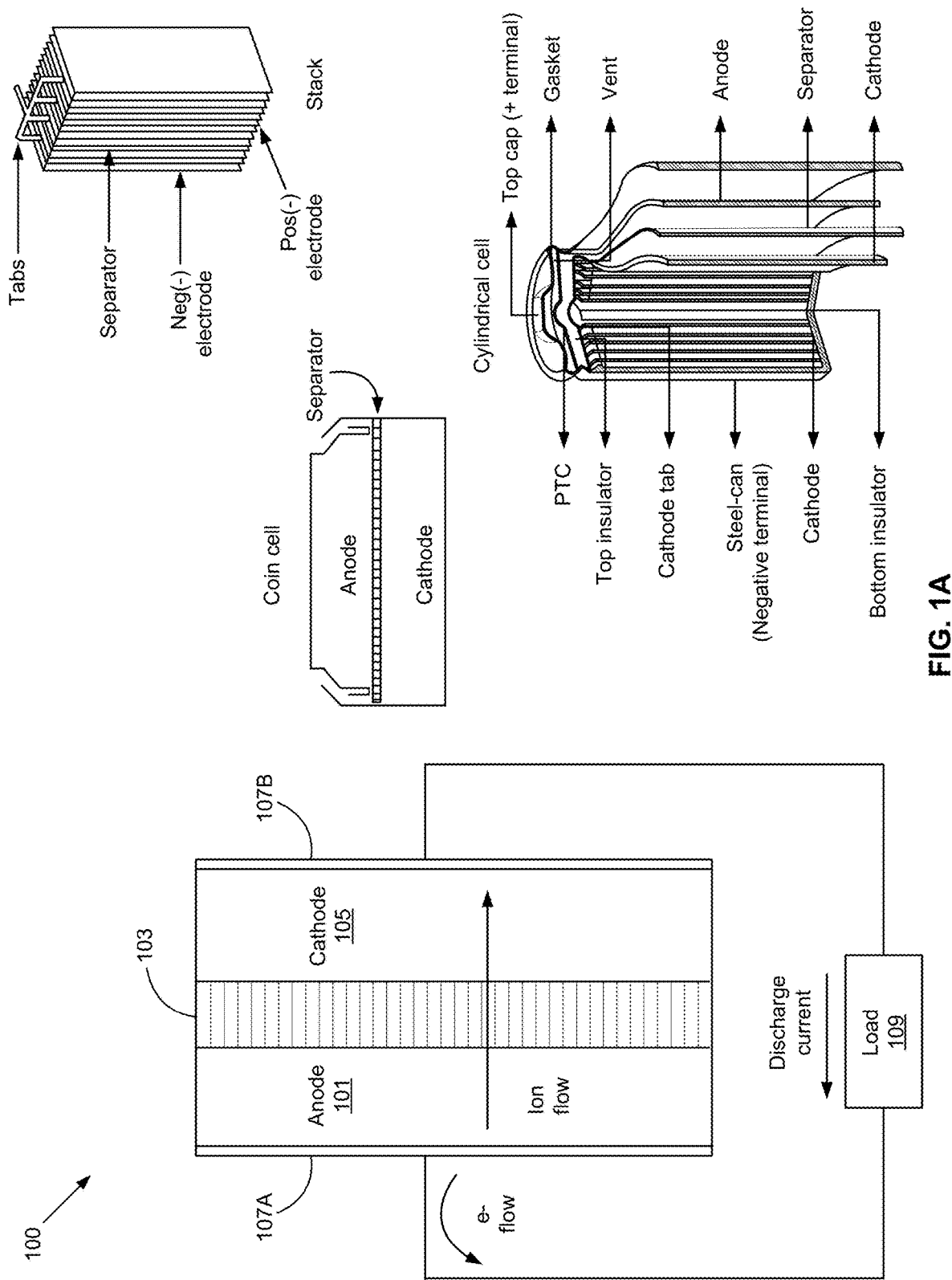
FIG. 1A is a diagram of an example battery.

FIG. 1A is a diagram of an example battery. Referring to FIG. 1A, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack. Furthermore, the battery 100 shown in FIG. 1A is a very simplified example merely to show the principle of operation of a lithium ion cell. Examples of realistic structures are shown to the right in FIG. 1A, where stacks of electrodes and separators are utilized, with electrode coatings typically on both sides of the current collectors. The stacks may be formed into different shapes, such as a coin cell, cylindrical cell, or prismatic cell, for example.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode 105 are electrically coupled to the current collectors 107A and 107B, which comprise metal or other conductive material for providing electrical contact to the electrodes as well as physical support for the active material in forming electrodes.

The configuration shown in FIG. 1A illustrates the battery 100 in discharge mode, whereas in a charging configuration, the load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. In this regard, different methods or processes may be used in forming electrodes, particularly silicon-dominant anodes. For example, lamination or direct coating may be used in forming a silicon anode. Examples of such processes are illustrated in and described with respect to FIGS. 2 and 3. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. In an example scenario, the electrolyte may comprise Lithium hexafluorophosphate ($LiPF_6$) and lithium bis(trifluoromethanesulfonyl)imide (LiTFSI) that may be used together in a variety of electrolyte solvents. Lithium hexafluorophosphate ($LiPF_6$) may be present at a concentration of about 0.1 to 2.0 molar (M) and lithium bis(trifluoromethanesulfonyl)imide (LiTFSI) may be present at a concentration of about 0 to 2.0 molar (M). Solvents may comprise one or more of ethylene carbonate (EC), fluoroethylene carbonate (FEC) and/or ethyl methyl carbonate (EMC) in various percentages. In some embodiments, the electrolyte solvents may comprise one or more of EC from about 0-40%, FEC from about 2-40% and/or EMC from about 50-70% by weight.

The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 4200 mAh/g. In order to increase volumetric and gravimetric energy density of lithium-ion batteries, silicon may be used as the active material for the cathode or anode. Silicon anodes may be formed from silicon composites, with more than 50% silicon or more by weight in the anode material on the current collector, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1A for example, and vice versa through the separator 105 in charge mode. The movement of the lithium ions creates free electrons in the anode 101 which creates a charge at the positive current collector 107B. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (Super P), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge as well as provide additional mechanical robustness to the electrode and provide mechanical strength (e.g., to keep the electrode material in place). Graphenes and carbon nanotubes may be used because they may show similar benefits. Thus, in some instances, a mixture of two or more of carbon black, vapor grown carbon fibers, graphene, and carbon nanotubes may be used as such mixtures or combinations may be especially beneficial.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a low lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

In addition, the large silicon volume changes exacerbate solid electrolyte interphase (SEI) formation, which can further lead to electrical isolation and, thus, capacity loss. Expansion and shrinkage of silicon particles upon charge-discharge cycling causes pulverization of silicon particles, which increases their specific surface area. As the silicon surface area changes and increases during cycling, SEI repeatedly breaks apart and reforms. The SEI thus continually builds up around the pulverizing silicon regions during cycling into a thick electronic and ionic insulating layer. This accumulating SEI increases the impedance of the electrode and reduces the electrode electrochemical reactivity, which is detrimental to cycle life.

In some embodiments, dedicated systems and/or software may be used to control and manage batteries or packs thereof. In this regard, such dedicated systems may comprise suitable circuitry for running and/or executing control and manage related functions or operations. Further, such software may run on suitable circuitry, such as on processing circuitry (e.g., general processing units) already present in the systems or it may be implemented on dedicated hardware. For example, battery packs (e.g., those used in electric vehicles) may be equipped with a battery management system (BMS) for managing the batteries (or packs) and operations. An example battery management system (BMS) is illustrated in and described in more detail with respect to FIG. 1B.

In accordance with the present disclosure, control and management of batteries, particularly lithium-ion batteries with silicon-dominant anodes (also referred to herein as "Si/Li batteries" or "Si—Li batteries"), and operation thereof may be improved, particularly by use of state-of-health (SOH) balanced control, such as in associated control and manage systems. In this regard, as noted above battery control and management systems (e.g., BMS) may be used to control the operation of a battery, or a battery pack that may be made up of multiple cells, so as to maximize the useful life of the batteries or packs thereof, to operate the batteries or packs thereof within safety limits, to maintain operational specifications (e.g., minimum power, charge rate, etc.) required for the operation of the batteries or packs thereof, and the like.

Such BMS may use or depend on various inputs and parameters pertinent to controlling the batteries or packs thereof. For example, SOH may be one of the key parameters used in the BMS. In this regard, the SOH of a battery (or pack of batteries) may be assessed based on one or more specific considerations or metrics, such as, for example, remaining useful life, possibility or closeness to failure, etc. In implementations with battery packs having multiple cells, the BMS may use calculated SOH of individual cells, groups of cells, or the module or pack as a whole.

Conventional solutions using or relaying on SOH for controlling and/or managing batteries may have some limitations and/or shortcomings, however. In this regard, conventionally the SOH values typically are used only to identify critical issues, such as shorted cells, damaged cells, and cells at or near end-of-life, as well as to indicate how much useful life is left. When these issues are detected, the cell is shut off or put into a protection mode. The BMS may not be configured to make small adjustments to operating parameters(s) of individual cells or groups of cells (for example cells that are connected in parallel) based on the SOH, however.

In a conventional Li-ion battery—that is, a Li-ion battery that typically contains graphite anodes (>50% graphite as the active material), the operating voltage window and maximum rate are clearly defined properties, so such small adjustments are not considered to be necessary. However, in emerging battery technologies such as Si/Li batteries and all-solid-state batteries, the tradeoffs between voltage window, lifetime, energy density, rate, and temperature, are more complex. Thus, the BMS configured for conventional operation may not necessarily optimize the operation of these more advanced batteries. Nonetheless, even for packs and modules made with conventional Li-ion batteries, balancing SOH on a cell, string, or other grouping of cell basis can yield improvements in durability and performance.

In implementations in accordance with the present disclosure, a BMS may be configured to support making small adjustments to operating parameters(s) (e.g., voltage) and/or to make such adjustments to individual cells or groups of cells in battery packs comprising multiples cells. These features are described in more detail below.

Figure 1B:
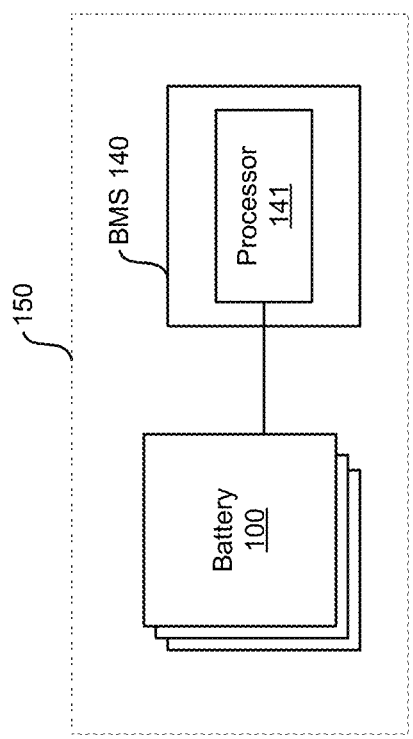
FIG. 1B illustrate an example battery management system (BMS) for use in managing operation of batteries.

FIG. 1B illustrate an example battery management system (BMS) for use in managing operation of batteries. Shown in FIG. 1B is battery management system (BMS) 140.

The battery management system (BMS) 140 may comprise suitable circuitry (e.g., processor 141) configured to manage one or more batteries (e.g., each being an instance of the battery 100 as described with respect with FIG. 1A). In this regard, the BMS 140 may be in communication and/or coupled with each battery 100.

In some embodiments, the battery 100 and the BMS 140 may be in communication and/or coupled with each other, for example, via electronics or wireless communication. In some embodiments, the BMS 140 may be incorporated into the battery 100. Alternatively, in some embodiments, the BMS 140 and the battery 100 may be combined into a common package 150. Further, in some embodiments, the BMS 140 and the battery 100 may be separate devices/components, and may only be in communication with one another when present in the same system. The disclosure is not limited to any particular arrangement, however.

In accordance with the present disclosure, control and management of batteries, particularly lithium-ion batteries with silicon-dominant anodes (Si/Li batteries), and operation thereof may be improved, particularly by use of SOH balanced control and management of the batteries or packs thereof. In this regard, battery control and management systems, such as the battery management system (BMS) 140 of FIG. 1B, may be configured to support and facilitate use of SOH balanced control and management functions. As noted above, a battery control and management system may be used to control the operation of a battery (or a battery pack, which may be made up of multiple cells), so as to maximize the useful life of the battery (or a battery pack), to operate the battery (or a battery pack) within safety limits, to maintain required operational specifications (e.g., minimum power, charge rate), and the like.

Such battery control and management systems may use or depend on various inputs and parameters in controlling the battery. One such input or parameter may be SOH value(s). In conventional solutions, however, battery control and management systems are typically not configured to make small adjustments to operating parameters(s) of the battery (or of individual cells or groups of cells within a battery pack) based on the SOH values. Rather, in conventional solutions the SOH values are typically used only in conjunction with critical issues (e.g., only to shut down cells when an SOH threshold is crossed, such as when SOH value signifies shorted cells, damaged cells, and cells at or near end-of-life), or to indicate how much useful life is left.

In this regard, BMS 140 may be configured to routinely calculate the SOH of cells in the battery pack. However, in conventional solutions the operation of the individual cells or groups of cells connected in parallel is not modified based on this calculation, except for binary measures such as shutting off operation of a cell deemed to be damaged or in a critical state. In accordance with the present disclosure, however, BMS 140 may be configured to make small adjustments to operating parameters(s), including those of individual cells or groups of cells in parallel, based on the SOH, and particularly to ensure balanced SOH across the cells. For example, adjustments to voltage may be made to account for differences in resistance across the cells. In this regard, the goal may be to keep all cells at the same voltage, rather than operating at different voltages.

In an example implementation, BMS 140 may be configured to control or adjust (e.g., set or modify) one or more operating parameters of individual batteries, or "cells", strings of cells, groups of cells that are connected in parallel, or other groups of cells (such as a module) in a battery module or pack, to equilibrate or at least modify the SOH to be closer to each other, ensuring all the cells or groups of cells are at a more uniform SOH. The cells may comprise silicon as active material. In particular, the cells may comprise >50% silicon as active material.

In an example implementation, the SOH may be defined as one or a combination of characteristics and parameters that may include, but are not limited to, remaining useful life in units of energy, remaining useful life in units of capacity, discharge capacity under a standard measurement condition, energy density under a standard measurement condition, resistance under a standard measurement condition, and total time to charge a specific portion of the cell, for instance, time to charge from 20% state-of-charge (SOC) to 80% SOC, time to charge 0% SOC to 80% SOC, time to charge 0% SOC to 100% SOC, etc., under a standard charging protocol.

In an example implementation, the one or more operating parameters that may be adjusted may include, but are not limited to, minimum voltage, maximum voltage, maximum charge rate, maximum discharge rate, pressure applied to the cell or groups of cells, and target temperature range for an active cooling system.

In an example implementation, the SOH may be calculated using a model. In this regard, SOH models may be defined or configured (e.g., by users, battery designers/makers) for assessing SOH of a battery or pack of batteries based on one or more specific considerations or metrics.

In an example implementation, the SOH model may be based on a physics-based model of the cell. In this regard, such physics-based model may be based on any combination of physical phenomena modeled as factors that affect the SOH. The physical phenomena may be modeled using such factors as irreversible consumption of cyclable Li caused by a reduction reaction on the anode, irreversible consumption of cyclable Li caused by a oxidation reaction on the cathode, growth of a resistive solid-electrolyte-interface (SEI) layer as a result of irreversible reactions, loss of cathode active material resulting from high-voltage-induced degradation, loss of anode active material due to repeated volume change, the cracking of SEI, exposing unpassivated surfaces that have higher irreversible reaction rates, and an SEI cracking rate that is dependent on a probability density function that depends on the local state-of-charge. The physical phenomena may be modeled as a function of properties or parameters such as local current density, voltage, Li-ion concentration, temperature, pressure, and/or electric field throughout the cell, and/or as a function of the physical material properties of the materials in the cell.

In an example implementation, the SOH model may be a machine-learning (ML) model trained on data acquired during operation of multiple cells and battery packs. The ML model may be trained using one or more ML algorithms that may include, but are not limited to, linear regression, logistic regression, nonlinear regression, decision tree ensemble methods (e.g., gradient boosting or random forests), neural networks, recurrent neural networks, long-short-term memory networks, multilayer perceptrons, Gaussian process algorithms, Bayesian algorithms, support vector regression, K-nearest-neighbors regression, and graph neutral networks.

In an example implementation, the ML model may be trained using any combination of data features that may include, but are not limited to, cumulative capacity, cumulative energy, average rate, average temperature, maximum rate, minimum temperature, maximum temperature, cumulative capacity and/or energy binned by voltage, cumulative capacity and/or energy binned by rate, cumulative capacity and/or energy binned by temperature, statistical comparisons of voltage profiles throughout the life of the battery, curve fits of other quantitative calculations based on portions of voltage profiles, voltage, thickness, and impedance measurements acquired during the manufacture of the cell, features calculated based on the voltage profile of the cell during factory formation, the coulombic efficiency of the cell during formation, and the minimum, maximum, and/or average temperature of the cell measured during formation.

In an example implementation, the SOH model may take as an input the predicted useful life of the cell based on a separate predictive model. This predictive model can be any of the model types described above and can take as input any of the features described above.

In an example implementation, the SOH model may be configured as a semi-empirical model—that is, being based on a mixture of physics and fits to data.

In an example implementation, the SOH may be determined based on or using a combination of models, such as including, but not limited to, the various SOH models described herein.

In an example implementation, parameters used in the SOH model(s) for each cell or group of cells may be based on data acquired in the factory. For example, such data may include, but is not limited to, cell thickness, cell resistance, cell open-circuit-voltage (OCV), any data related to or acquired during the formation of the cell and/or fabrication of the cell components.

In an example implementation, parameters used in the SOH model(s) for each cell or group of cells may be based on, or be updated based on, data acquired during the operation of the cell(s).

In an example implementation, the SOH prediction per cell or group of cells may be updated based on the deviation between the most recent SOH calculation and SOH measurement(s), or based on changes to the predicted useful life generated by the SOH model. For example, in a scenario where the true SOH of a cell is occasionally measured, on measurement number n, the difference between the measured SOH and the calculated SOH is $\delta$. For subsequent calculations of SOH (until the next measurement), $\delta$ may be added to SOH value generated by the SOH model(s) to generate an updated calculation, and such updated calculation of SOH may be used by BMS 140. The procedure may be repeated after each measurement of true SOH is made.

In an example implementation, action(s) taken by BMS 140 based on SOH prediction per cell or group of cells by the SOH model(s) may be updated using reinforcement learning. For example, with a ML-based SOH model, BMS 140 operates in a discrete series of time steps. At each step, BMS 140 measures the state of the system (this is the data that is input to the model), and the reward; some quantitative measure of how well it performed in the previous step, such as the change in slope of d(SOH)/dt. The control and management system may be configured take some action based on such information, such as adjusting a particular operating parameter (e.g., minimum voltage) of one cell. For the next time step, the control and management system uses a reinforcement learning algorithm to determine the optimal action, based on the outcomes of all previous actions. In this way, the relationship between calculated SOH and action taken is not a fixed set of rules, but instead varies based on the reinforcement learning algorithm.

In an example implementation, BMS 140 may be configured to keep the cells or groups of cells within a particular, predefined range with respect to a particular value or parameter. For example, BMS 140 may be configured to keep the cells or groups of cells within 5%, 2%, 1% or 0.5% of a tracked value at any given point in the life of the pack. The tracked value may be the median or average of the cells in the pack. The tracked value may be calculated and tracked using a predictive ML model for the pack.

In an example implementation, the one or more operating parameters may comprise discharge cutoff voltage, and the discharge cutoff voltage may be set or modified to balance the SOH of the cells or groups of cells.

In an example implementation, operational data may be used to detect cells or groups of cells that are underperforming (e.g., more fade, lower SOH) compared to the overall population, and BMS 140 may be configured to adjust the one or more operating parameters to thereby adjust one or more attributes of SOH. The one or more attributes may comprise SOH fade, and the adjusting may comprise increasing or decreasing the SOH fade.

In an example implementation, BMS 140 may be configured to modify both discharge cutoff voltage and SOH fade.

In an example implementation, BMS 140 may be configured to adjust at least one of the one or more operating parameters based on a predictive model rather than comparison to the overall population.

Accordingly, BMS 140 implemented or configured based on the present disclosure may have finer control over individual cells or groups of cells in a battery pack, achieving better optimization of the system. In particular, using a Si/Li battery chemistry, solutions based on the present disclosure balance the tradeoff between energy density and useful lifetime on an individual or group of cell basis, achieving the maximum combined energy density and lifetime which will improve both performance as well as total cost of ownership. Such solutions can be fully tuned to the specific application of the battery pack. Example requirements are the existence of a model capable of calculating the SOH, and an algorithm in BMS 140 that translates the SOH calculation into the set cell parameters.

Nonetheless, while various implementations are described herein with respect to Si/Li batteries, the disclosure is not so limited, and solutions based thereon may also be used with other cell chemistries. Also, solutions based on the present disclosure may be used with a single cell or on any number of cells. Solutions based on the present disclosure may allow for changing target parameters halfway through operation—e.g., it may start out maintaining an SOH value above a particular value (e.g., 90%) and then switch to maintaining an SOH above a lower value (e.g., 80%) once a certain condition is met or it may just try to keep the SOH value at any point in time within a certain percentage or band from the median, average, or other expected value of the entire pack. Further, solutions in accordance with the present disclosure may be combined with actions taken by a BMS described by the prior art, for instance, it may balance the cell SOH values, but put a cell into protection mode if it experiences a sudden decline in SOH.

Figure 2:
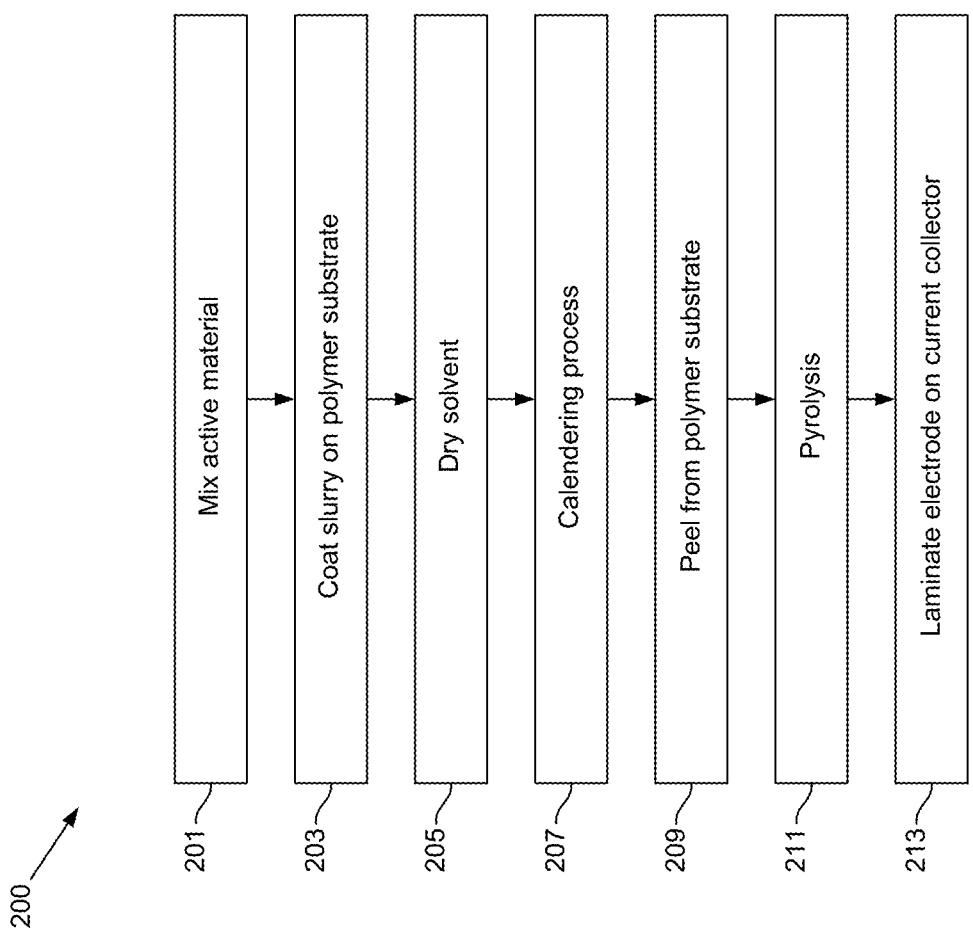
FIG. 2 is a flow diagram of an example lamination process for forming a silicon anode.

FIG. 2 is a flow diagram of an example lamination process for forming a silicon anode. Shown in FIG. 2 is flow chart 200, comprising a plurality of example steps (represented as blocks 201-213) for an example lamination process. In this regard, this process employs a high-temperature pyrolysis process on a substrate, layer removal, and a lamination process to adhere the active material layer to a current collector.

The raw electrode active material is mixed in step 201. In the mixing process, the active material may be mixed, e.g., a binder/resin (such as PI, PAI), solvent (e.g., as organic or aqueous), and conductive additives. The materials may comprise carbon nanotubes/fibers, graphene sheets, graphene oxide, metal polymers, metals, semiconductors, and/or metal oxides, for example. The additives may comprise 1D filaments with one dimension at least 4×, at least 10×, or at least 20× that of the other two dimensions, 2D sheets or mesh with two dimensions at least 4×, at least 10×, or at least 20× that of the other dimension, or 3D structures with one dimension at least 20×, at least 10×, or at least 4× that of the other two, where none of the dimensions are of nanoscale size. Silicon powder with a 1-30 or 5-30 µm particle size, for example, may then be dispersed in polyamic acid resin (15% solids in N-Methyl pyrrolidone (NMP)) at, e.g., 1000 rpm for, e.g., 10 minutes, and then the conjugated carbon/NMP slurry may be added and dispersed at, e.g., 2000 rpm for, e.g., 10 minutes to achieve a slurry viscosity within 2000-4000 cP and a total solid content of about 30%.

In step 203, the slurry may be coated on a substrate. In this step, the slurry may be coated onto a Polyester, polyethylene terephthalate (PET), or Mylar film at a loading of, e.g., 2-4 mg/cm$^2$ and then in step 205 undergo drying to an anode coupon with high Si content and less than 15% residual solvent content. This may be followed by an optional calendering process in step 207, where a series of hard pressure rollers may be used to finish the film/substrate into a smoothed and denser sheet of material.

In step 209, the green film may then be removed from the PET, where the active material may be peeled off the polymer substrate, the peeling process being optional for a polypropylene (PP) substrate, since PP can leave ~2% char residue upon pyrolysis. The peeling may be followed by a pyrolysis step 211 where the material may be heated to >900° C. but less than 1250° C. for 1-3 hours, cut into sheets, and vacuum dried using a two-stage process (120° C. for 15 h, 220° C. for 5 h). The dry film may be thermally treated at, e.g., 1100-1200° C. to convert the polymer matrix into carbon.

In step 213 the electrode material may be laminated on a current collector. For example, a 5-20 µm thick copper foil may be coated with polyamide-imide with a nominal loading of, e.g., 0.2-0.6 mg/cm$^2$ (applied as a 6 wt % varnish in NMP and dried for, e.g., 12-18 hours at, e.g., 110° C. under vacuum). The anode coupon may then be laminated on this adhesive-coated current collector. In an example scenario, the silicon-carbon composite film is laminated to the coated copper using a heated hydraulic press. An example lamination press process comprises 30-70 seconds at 300° C. and 3000-5000 psi, thereby forming the finished silicon-composite electrode.

The process described above is one example process that represents a composite with fabrication steps including pyrolysis and lamination. Another example scenario comprises a direct coating process in which an anode slurry is directly coated on a copper foil using a binder such as CMC, SBR, Sodium Alginate, PAI, PI, PAA, and mixtures and combinations thereof. The process in this example comprises: direct coat active material on a current collector, dry, calendering, heat treatment.

In a direct coating process, an anode slurry is coated on a current collector with residual solvent followed by a calendaring process for densification followed by pyrolysis (~500-800° C.) such that carbon precursors are partially or completely converted into pyrolytic carbon. Pyrolysis can be done either in roll form or after punching. If done in roll form, the punching is done after the pyrolysis process.

In another example of a direct coating process, an anode slurry may be coated on a current collector with low residual solvent followed by a calendaring process for densification followed by removal of residual solvent.

Figure 3:
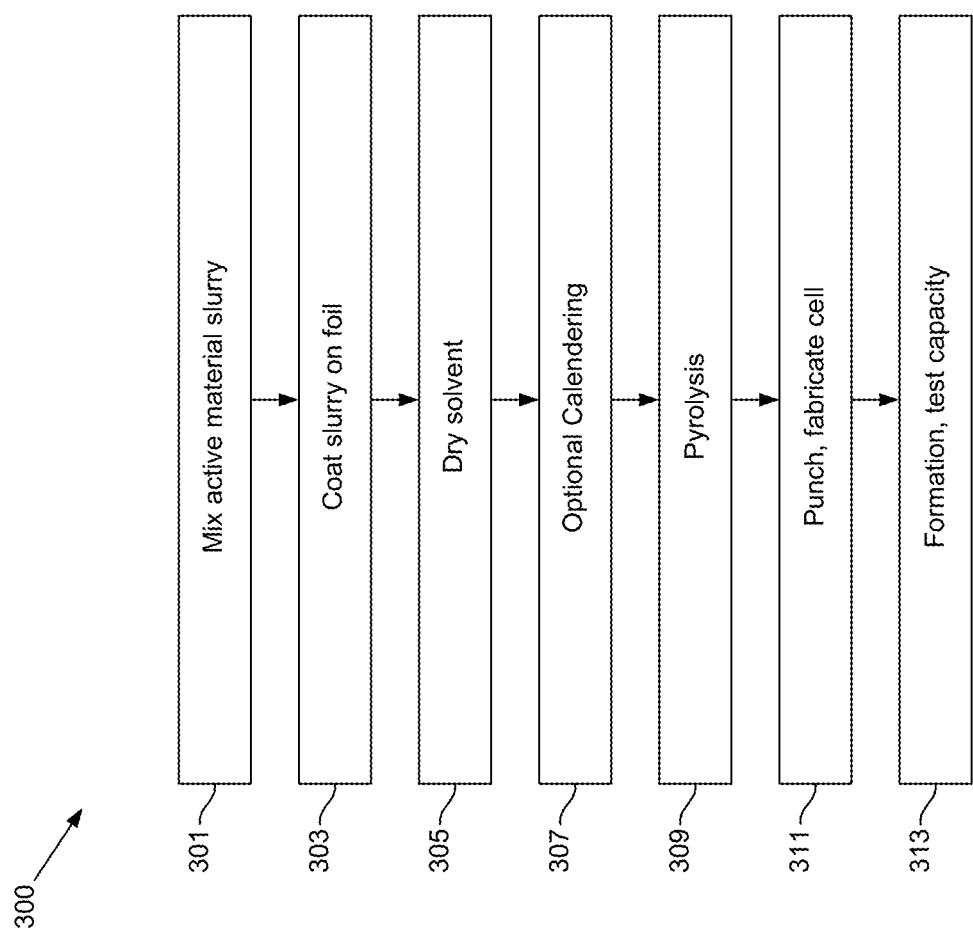
FIG. 3 is a flow diagram of an example direct coating process for forming a silicon anode.

In an example scenario, the conductive structural additives, which may be added in step 201 in FIG. 2 or step 301 in FIG. 3, may comprise between 1 and 40% by weight of the anode composition, with between 50% and 99% silicon by weight. The fibrous (1D) particles may have an aspect ratio of at least 4, but may be higher than 10, higher than 20, or higher than 40, for example, and may comprise a tubular or fiber-like conductive structure with nanoscale size in two-dimensions, where carbon-based examples comprise carbon nanotubes, carbon nanofibers (CNF), and vapor grown carbon fibers (VGCP). Other fibrous structures are possible, such as metals, metal polymers, metal oxides The 2D carbon structures may have an average dimension in the micron scale in each of the two non-nanoscale dimensions that is at least 4× that in the thickness direction, for example, and may be at least 20× larger, or at least 40× larger in the lateral directions as compared to the thickness direction. Graphene sheets are an example of conductive carbon additives, while other 2D structures are possible, such as "wire" meshes of metal or metal polymers, for example.

Furthermore, the active material may comprise 3D conductive structural additives, where the material is not limited to nanoscale in any one dimension. In a 3D additive example, one dimension of the structure may be at least 4×, at least 10×, or at least 20× that of the other two dimensions, where none of the dimensions are of nanoscale size. Examples of 3D conductive structural additives may be "chunks" of carbon, metal, metal polymer, or semiconductors.

In another example scenario, the anode active material layer fabricated with the carbon additive described above may comprise 20 to 95% silicon and in yet another example scenario may comprise 50 to 95% silicon by weight.

FIG. 3 is a flow diagram of an example direct coating process for forming a silicon anode. Shown in FIG. 3 is flow chart 300, comprising a plurality of example steps (represented as blocks 301-313) for an example direct coating process. In this regard, this process comprises physically mixing the active material, conductive additive, and binder together, and coating it directly on a current collector. This example process comprises a direct coating process in which an anode or cathode slurry is directly coated on a copper foil using a binder such as CMC, SBR, Sodium Alginate, PAI, PI, PAA, and mixtures and combinations thereof.

In step 301, the active material may be mixed, e.g., a binder/resin (such as PI, PAI), solvent, and conductive and structural additive. For example, the additives may comprise conductive materials that also provide structural continuity between cracks in the anode following multiple cycles. The materials may comprise carbon nanotubes/fibers, graphene sheets, metal polymers, metals, semiconductors, and/or metal oxides, metal/carbon nanofiber or metal/carbon nanotube composites, carbon nanowire bundles, for example. Silicon powder with a 5-30 μm particle size, for example, may then be dispersed in polyamic acid resin (15% solids in N-Methyl pyrrolidone (NMP)) at, e.g., 1000 rpm for, e.g., 10 minutes, and then the conjugated carbon/NMP slurry may be added and dispersed at, e.g., 2000 rpm for, e.g., 10 minutes to achieve a slurry viscosity within 2000-4000 cP and a total solid content of about 30%.

Furthermore, cathode active materials may be mixed in step 301, where the active material may comprise lithium cobalt oxide (LCO), lithium manganese oxide (LMO), lithium iron phosphate (LFP), lithium nickel cobalt manganese oxide (NMC), lithium nickel cobalt aluminum oxide (NCA), nickel, cobalt, manganese and aluminum (NCMA), lithium nickel manganese spinel, or similar materials or combinations thereof, mixed with a binder as described above for the anode active material.

In step 303, the slurry may be coated on a copper foil. Similarly, cathode active materials may be coated on a foil material, such as aluminum, for example. The active material layer may undergo a drying in step 305 resulting in reduced residual solvent content. An optional calendering process may be utilized in step 307 where a series of hard pressure rollers may be used to finish the film/substrate into a smoother and denser sheet of material. In step 307, the foil and coating proceeds through a roll press for lamination.

In step 309, the active material may be pyrolyzed by heating to 500-1000° C. such that carbon precursors are partially or completely converted into glassy carbon. The pyrolysis step may result in an anode active material having silicon content greater than or equal to 50% by weight, where the anode has been subjected to heating at or above 400° C.

Pyrolysis can be done either in roll form or after punching in step 311. If done in roll form, the punching is done after the pyrolysis process. In instances where the current collector foil is not pre-punched/pre-perforated, the formed electrode may be perforated with a punching roller, for example. The punched electrodes may then be sandwiched with a separator and electrolyte to form a cell. In some instances, separator with significant adhesive properties, in accordance with the present disclosure, maybe utilized.

In step 313, the cell may be subjected to a formation process, comprising initial charge and discharge steps to lithiate the anode, with some residual lithium remaining, and the cell capacity may be assessed.

Figure 4:
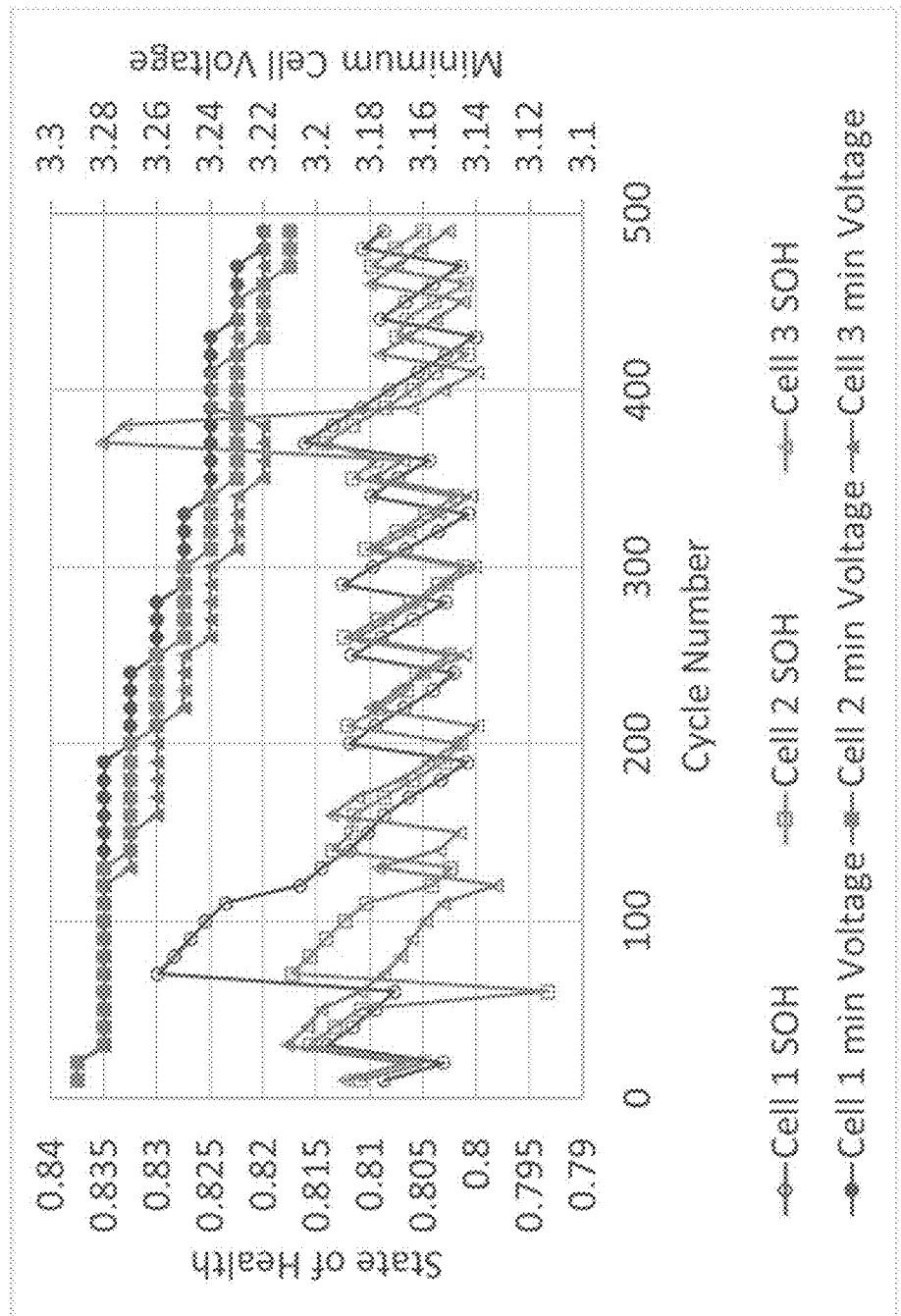
FIG. 4 is a plot diagram illustrating example simultaneous operation of cells whose minimum voltages are adjusted by a state-of-health (SOH) model-based battery management system (BMS) algorithm.

FIG. 4 is a plot diagram illustrating example simultaneous operation of cells whose minimum voltages are adjusted by a state-of-health (SOH) model-based battery management system (BMS) algorithm. Shown in FIG. 4 is graph 400.

In this regard, graph 400 illustrates example simultaneous operation of cells whose minimum voltages are adjusted by a SOH model-based BMS algorithm in order to maintain the SOH of each cell above particular value (e.g., 80%) while maximizing useful life of the cell(s).

In particular, in the example scenario illustrated in graph 400 multiple cells are operated simultaneously, where a particular operating parameter—namely, minimum voltage—of each individual cell is controlled separately to maintain an SOH value above 80%. In this example, SOH is defined as the discharge capacity from maximum cell voltage to minimum cell voltage at a rate of C/2, normalized to the nominal capacity of the cell. Every 10 cycles, the BMS algorithm uses a model to calculate the SOH value 10 cycles into the future and determines the highest value of the minimum voltage that results in an SOH value over 80%. Controlling the cells in this manner may simultaneously maintain an SOH value in the desired range over 80% and maximizing the useful life of the cell.

As data in graph 400 indicates the operating cell voltage window may not be the same for all three cells on a given cycle, unlike conventional BMS solutions which would maintain all cells in the same voltage window. In this particular example, the SOH model that calculates the SOH may be a physics-based model, as described above. However, the nature of the model is not restricted, as long as it provides a calculation of the SOH in accordance with the present disclosure—that is, with the SOH model being configured to allow for determining and applying small and adaptive adjustments to particular operating parameter(s), and to do so for individual or groups of cells in packs comprising multiple cells.

Figure 5:
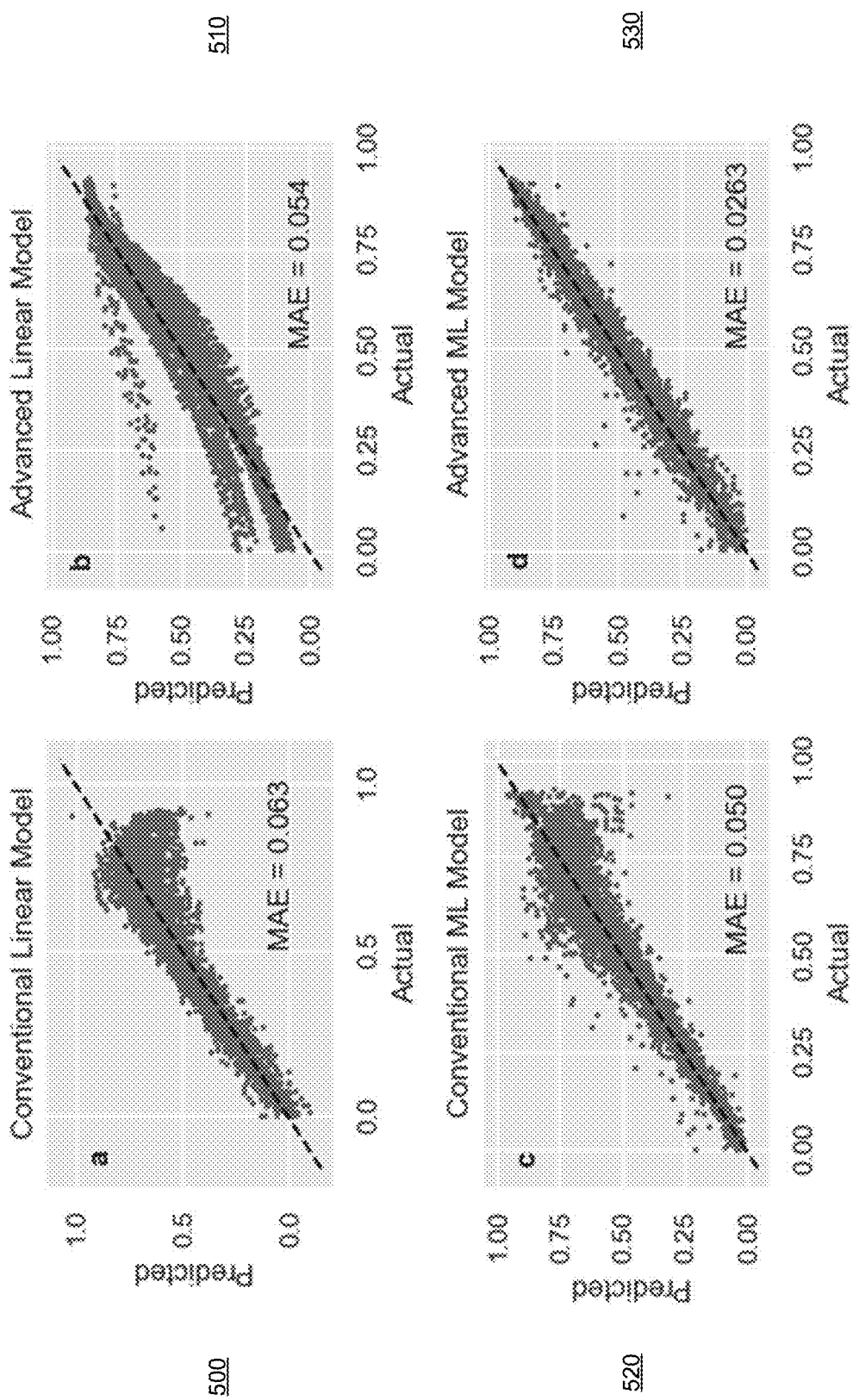
FIG. 5 is a plot diagram illustrating comparisons between conventional state-of-health (SOH) models and advanced SOH models in accordance with the present disclosure.

FIG. 5 is a plot diagram illustrating comparisons between conventional SOH models and advanced SOH models in accordance with the present disclosure. Shown in FIG. 5 are graphs 500, 510, 520 and 530.

In this regard, graphs 500 and 520 illustrate performance of conventional SOH models whereas graphs 510 and 530 illustrate performance of advanced SOH models in accordance with the present disclosure. Each of graphs 500, 510, 520 and 530 shows a plot of predicted versus measured SOH values, to illustrate performance comparison between conventional SOH models—that is, SOH models configured for use in conjunction with conventional Li-ion battery SOH model features—versus advanced (SOH) models as described in the present disclosure.

The mean absolute error (MAE) is displayed for each model in these graphs. The conventional models illustrated in graphs 500 and 520 are based upon features that are extracted from standardized measurements of the cell(s), such as midpoint voltage, open-circuit voltage, and DC impedance, while the advanced models illustrated in graphs 510 and 530 are based on the data features described above. The conventional features result in models that are less accurate, and require a standardized measurement, which is not always an option when deployed in an actual battery application. The Linear models illustrated in graphs 500 and 510 are trained using linear regression on the data features, whereas the ML-based models illustrated in graphs 520 and 530 are trained using nonlinear machine learning algorithms. As illustrated clearly in FIG. 5, the best application of a SOH model in the BMS algorithm is the ML model with advanced features, as described above.

Figure 6:
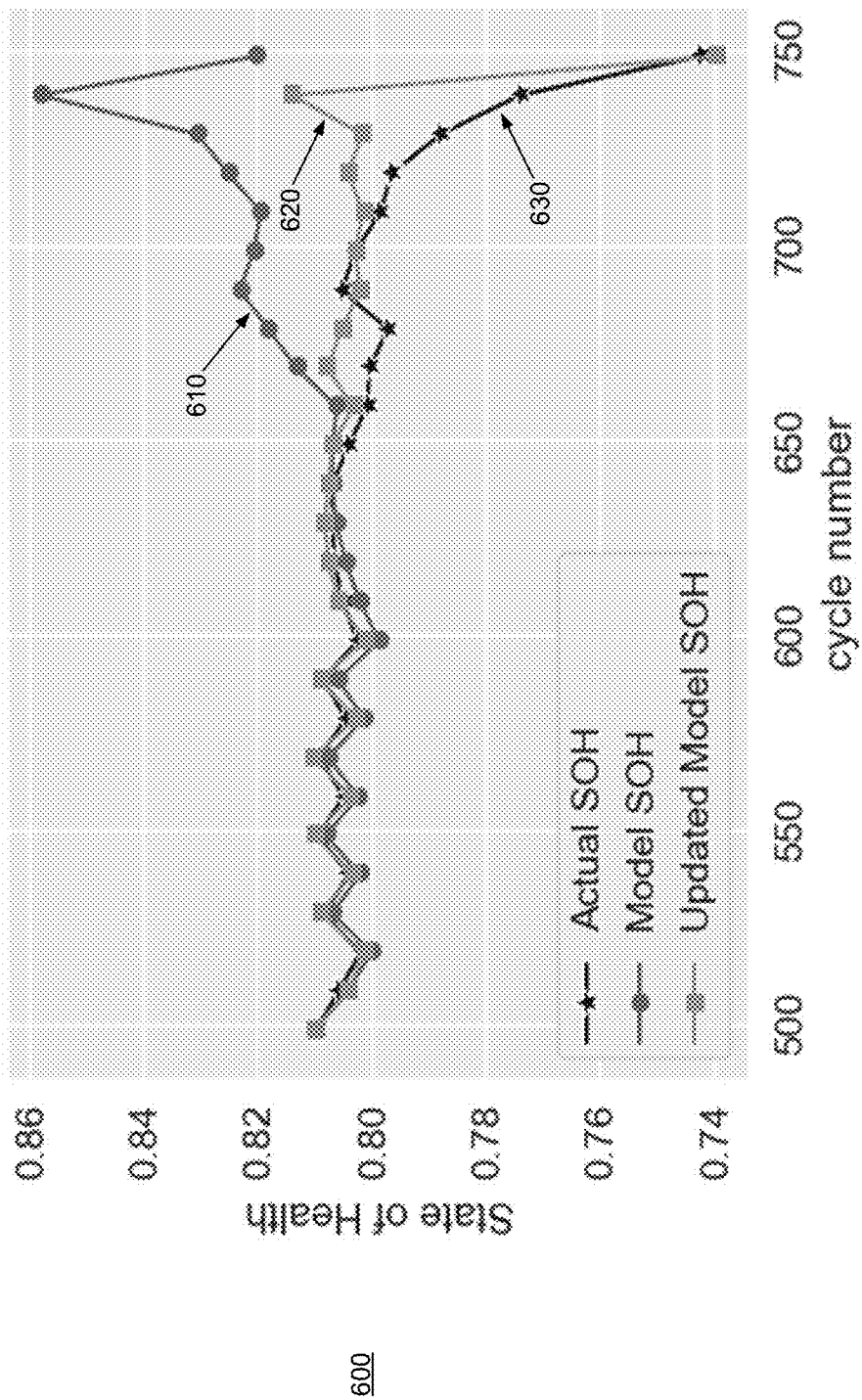
FIG. 6 is a plot diagram illustrating comparisons between model-calculated and actual values of state-of-health (SOH) with and without model updates.

FIG. 6 is a plot diagram illustrating comparisons between model-calculated and actual values of state-of-health (SOH) with and without model updates. Shown in FIG. 6 is graph 600.

In this regard, graph 600 illustrates a comparison between model-calculated and actual values of SOH where the SOH model is not updated during the operation of the cell (plot 610) and where the SOH model is updated based on deviation between the calculated and measured values of SOH (plot 620). In particular, shown in graph 600 are the actual (measured) SOH values (plot 630) compared to the modeled SOH during the operation of the cell. In one case, the model is not updated over the course of the operation of the cell. In the other case, the model is updated based on the deviation between the measured and calculated values of SOH. The model that is updated continuously has better agreement with the measured values, and correctly tracks events where the SOH suddenly changes, such as at cycle 7.

Figure 7:
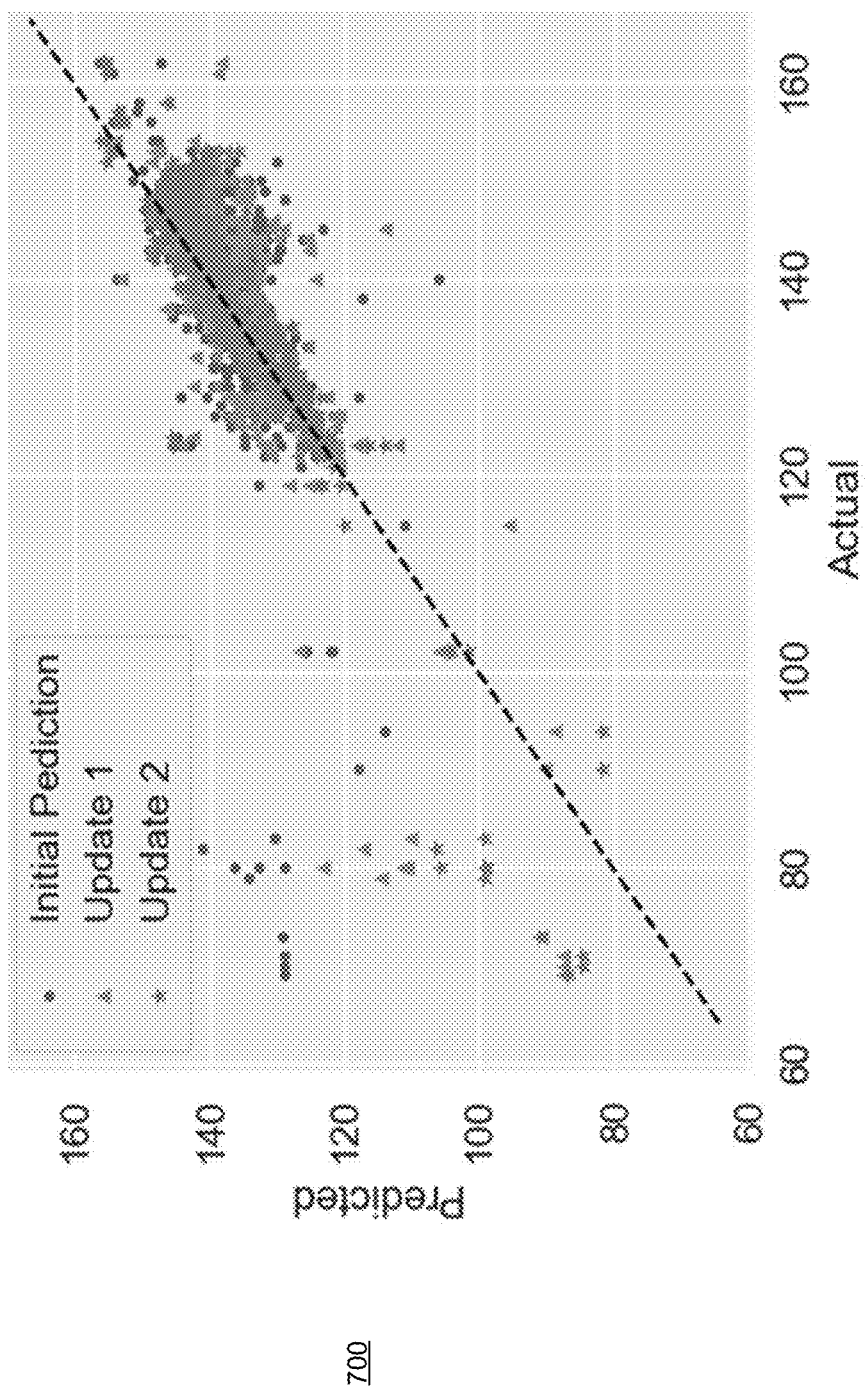
FIG. 7 is a plot diagram illustrating an example use scenario of a model that predicts useful life of a cell and that is updated periodically as the cell is operated.

FIG. 7 is a plot diagram illustrating an example scenario of a model that predicts useful life of a cell and that is updated periodically as the cell is operated. Shown in FIG. 7 is graph 700.

In this regard, graph 700 illustrates an example scenario associated with a model that predicts useful life of a cell that is updated periodically as the cell is operated. As shown in graph 700, the model improves in accuracy after each update. This prediction may be used as input feature to the SOH model in BMS 140.

In particular, graph 700 shows predicted useful life of a group of cells compared to their measured useful life for a predictive model. The model uses features calculated from, for example, cell fabrication, formation, and operation to make a prediction of useful life. As the cell is operated, the prediction is updated based on the most recent data acquired from the cell.

As illustrated in graph 700, after each update, the model prediction becomes more accurate. The predicted value(s) may be used as data feature(s) in the SOH model in the BMS, and its value may be periodically updated. This allows the BMS to better control and manage the cells—e.g., appropriately treat cells that are prone to underperforming/overperforming. The efficacy of this approach improves as the prediction is updated.

An example method, in accordance with the present disclosure, for managing a battery pack comprising one or more lithium-ion cells comprises: assessing SOH of the one or more lithium-ion cells; and controlling, based on the assessing of SOH, the one or more lithium-ion cells; wherein the controlling comprises setting or modifying one or more operating parameters of at least one lithium-ion cell; and wherein the controlling is configured to equilibrate the SOH of the one or more lithium-ion cells or to modify a SOH of at least one lithium-ion cell so that the one or more lithium-ion cells have a uniform SOH.

In an example embodiment, each of the one or more lithium-ion cells comprises a silicon-dominant cell comprising a silicon-dominant anode with silicon >50% of active material of the anode.

In an example embodiment, assessing the SOH comprises assessing one or more of remaining useful life in units of energy, remaining useful life in units of capacity, discharge capacity under a standard measurement condition, energy density under a standard measurement condition, resistance under a standard measurement condition, total time to charge a specific portion of the cell, for instance, time to charge from 20% state-of-charge (SOC) to 80% SOC, time to charge 0% SOC to 80% SOC, time to charge 0% SOC to 100% SOC, under a standard charging protocol.

In an example embodiment, the one or more operating parameters comprise at least one of minimum voltage, maximum voltage, maximum charge rate, maximum discharge rate, and pressure applied to the cell or groups of cells, and a target temperature range for an active cooling system associated with the battery pack.

In an example embodiment, assessing the SOH comprises calculating the SOH using one or more SOH models.

In an example embodiment, the method further comprises configuring at least one SOH model based on a physics-based model associated with at least one lithium-ion cell, and wherein the physics-based model comprises information relating to modeling of one or more physical phenomena as factors that reduce the SOH.

In an example embodiment, the method further comprises modeling the one or more physical phenomena as a function of one or more of local current density, voltage, lithium-ion concentration, temperature, pressure, electric field throughout the at least one lithium-ion cell, and physical material properties of materials in the at least one lithium-ion cell.

In an example embodiment, the method further comprises configuring at least one SOH model based on a machine-learning (ML) model.

In an example embodiment, the method further comprises training the ML model using one or more ML algorithms comprising at least one of linear regression, logistic regression, nonlinear regression, decision tree ensemble methods, neural networks, recurrent neural networks, long-short-term memory networks, multilayer perceptrons, Gaussian process algorithms, Bayesian algorithms, support vector regression, K-nearest-neighbors regression, and graph neutral networks.

In an example embodiment, the method further comprises training the ML model using training data.

In an example embodiment, the training data comprises one or more data features comprising at least one of cumulative capacity, cumulative energy, average rate, average temperature, maximum rate, minimum temperature, maximum temperature, cumulative capacity and/or energy binned by voltage, cumulative capacity and/or energy binned by rate, cumulative capacity and/or energy binned by temperature, statistical comparisons of voltage profiles throughout the life of the battery, curve fits of other quantitative calculations based on portions of voltage profiles, voltage, thickness, and impedance measurements acquired during the manufacture of the cell, features calculated based on the voltage profile of the cell during factory formation, the coulombic efficiency of the cell during formation, the minimum, maximum, or average temperature of the cell measured during formation.

In an example embodiment, the method further comprises configuring at least one SOH model based on predicted useful life for at least one lithium-ion cell, and further comprises obtaining the predicted useful life is using a separate predictive model.

In an example embodiment, the method further comprises configuring at least one SOH model using data related to or acquired during formation of at least one lithium-ion cell or fabrication of one or more components of at least one lithium-ion cell.

In an example embodiment, the assessing of the SOH comprises determining SOH prediction for at least one lithium-ion cell; and wherein the controlling comprising determining at least one action based on the SOH prediction.

In an example embodiment, the method further comprises determining the SOH prediction based on or using one or more of: deviation between a most recent SOH calculation and SOH measurement, changes to predicted useful life for the at least one lithium-ion cell, and reinforcement learning based modeling.

In an example embodiment, the method further comprises controlling the one or more lithium-ion cells to maintain the one or more lithium-ion cell within a predefined range of a tracked value at any given point in a life of the battery pack.

In an example embodiment, the one or more operating parameters comprise discharge cutoff voltage, and wherein the controlling comprising modifying the discharge cutoff voltage for at least one lithium-ion cell balance the SOH of the one or more lithium-ion cells.

An example system, in accordance with the present disclosure, comprises: one or more lithium-ion cells; and one or more circuits configured to: assess SOH of the one or more lithium-ion cells; and control, based on the assessing of SOH, the one or more lithium-ion cells. The controlling comprises setting or modifying one or more operating parameters of at least one lithium-ion cell, and the controlling is configured to equilibrate the SOH of the one or more lithium-ion cells or to modify a SOH of at least one lithium-ion cell so that the one or more lithium-ion cells have a uniform SOH.

In an example embodiment, each of the one or more lithium-ion cells comprises a silicon-dominant cell comprising a silicon-dominant anode with silicon >50% of active material of the anode.

In an example embodiment, the one or more circuits are configured to assess one or more of remaining useful life in units of energy, remaining useful life in units of capacity, discharge capacity under a standard measurement condition, energy density under a standard measurement condition, resistance under a standard measurement condition, total time to charge a specific portion of the cell, for instance, time to charge from 20% state-of-charge (SOC) to 80% SOC, time to charge 0% SOC to 80% SOC, time to charge 0% SOC to 100% SOC, under a standard charging protocol.

In an example embodiment, the one or more circuits are configured to calculate the SOH for at least one lithium-ion cell using one or more SOH models.

In an example embodiment, at least one SOH model is based on a physics-based model associated with at least one lithium-ion cell, and the physics-based model comprises information relating to modeling of one or more physical phenomena as factors that reduce the SOH, and the one or more circuits are configured to model the one or more physical phenomena as a function of one or more of local current density, voltage, lithium-ion concentration, temperature, pressure, electric field throughout the at least one lithium-ion cell, and physical material properties of materials in the at least one lithium-ion cell.

In an example embodiment, at least one SOH model comprises a ML based model, and wherein the one or more circuits are configured to train the ML based model using one or more ML algorithms comprising at least one of linear regression, logistic regression, nonlinear regression, decision tree ensemble methods, neural networks, recurrent neural networks, long-short-term memory networks, multilayer perceptrons, Gaussian process algorithms, Bayesian algorithms, support vector regression, K-nearest-neighbors regression, and graph neutral networks.

In an example embodiment, at least one SOH model comprises a ML based model, and wherein the one or more circuits are configured to train the machine-learning (ML) based model using training data.

In an example embodiment, the one or more circuits are configured to configure at least one SOH model based on predicted useful life for at least one lithium-ion cell, and further comprising obtaining the predicted useful life is using a separate predictive model.

In an example embodiment, the one or more circuits are configured to configure at least one SOH model using data related to or acquired during formation of at least one lithium-ion cell or fabrication of one or more components of at least one lithium-ion cell.

In an example embodiment, the one or more circuits are configured to, when assessing the SOH, determine SOH prediction for at least one lithium-ion cell, and to determine at least one action based on the SOH prediction.

In an example embodiment, the one or more circuits are configured to determine the SOH prediction based on or using one or more of: deviation between a most recent SOH calculation and SOH measurement, changes to predicted useful life for the at least one lithium-ion cell, and reinforcement learning based modeling.

In an example embodiment, the one or more circuits are configured to control the one or more lithium-ion cells to maintain the one or more lithium-ion cell within a pre-defined range of a tracked value at any given point in a life of a battery pack comprising the one or more lithium-ion cells.

In an example embodiment, the one or more operating parameters comprise discharge cutoff voltage, and where the one or more circuits are configured to modify the discharge cutoff voltage for at least one lithium-ion cell balance the SOH of the one or more lithium-ion cells.

As utilized herein, "and/or" means any one or more of the items in the list joined by "and/or". As an example, "x and/or y" means any element of the three-element set {(x), (y), (x, y)}. In other words, "x and/or y" means "one or both of x and y." As another example, "x, y, and/or z" means any element of the seven-element set {(x), (y), (z), (x, y), (x, z), (y, z), (x, y, z)}. In other words, "x, y and/or z" means "one or more of x, y, and z." As utilized herein, the term "exemplary" means serving as a non-limiting example, instance, or illustration. As utilized herein, the terms "for example" and "e.g." set off lists of one or more non-limiting examples, instances, or illustrations.

As utilized herein the terms "circuits" and "circuitry" refer to physical electronic components (e.g., hardware), and any software and/or firmware ("code") that may configure the hardware, be executed by the hardware, and or otherwise be associated with the hardware. As used herein, for example, a particular processor and memory (e.g., a volatile or non-volatile memory device, a general computer-readable medium, etc.) may comprise a first "circuit" when executing a first one or more lines of code and may comprise a second "circuit" when executing a second one or more lines of code. Additionally, a circuit may comprise analog and/or digital circuitry. Such circuitry may, for example, operate on analog and/or digital signals. It should be understood that a circuit may be in a single device or chip, on a single motherboard, in a single chassis, in a plurality of enclosures at a single geographical location, in a plurality of enclosures distributed over a plurality of geographical locations, etc. Similarly, the term "module" may, for example, refer to a physical electronic components (e.g., hardware) and any software and/or firmware ("code") that may configure the hardware, be executed by the hardware, and or otherwise be associated with the hardware.

As utilized herein, circuitry or module is "operable" to perform a function whenever the circuitry or module comprises the necessary hardware and code (if any is necessary) to perform the function, regardless of whether performance of the function is disabled or not enabled (e.g., by a user-configurable setting, factory trim, etc.).

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the processes as described herein.

Accordingly, various embodiments in accordance with the present invention may be realized in hardware, software, or a combination of hardware and software. The present invention may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip.

Various embodiments in accordance with the present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for managing a battery pack comprising a plurality of lithium-ion cells, the method comprising:
   assessing state-of-health (SOH) of the plurality of lithium-ion cells; and
   controlling, based on the assessing of state-of-health (SOH), the plurality of lithium-ion cells;
   wherein the controlling comprises setting or modifying one or more operating parameters of at least one lithium-ion cell; and
   wherein the controlling is configured to equilibrate the state-of-health (SOH) of the plurality of lithium-ion cells, so that state-of-health (SOH) values of all individual cells of the plurality of lithium-ion cells are closer to one another, or so that a state-of-health (SOH) value of each of the plurality of lithium-ion cells meets a same threshold criterion.

2. The method of claim 1, wherein each of the plurality of lithium-ion cells comprises a silicon-dominant cell comprising a silicon-dominant anode with silicon >50% of active material of the anode.

3. The method of claim 1, wherein assessing the state-of-health (SOH) comprises assessing one or more of remaining useful life in units of energy, remaining useful life in units of capacity, discharge capacity under a standard measurement condition, energy density under a standard measurement condition, resistance under a standard measurement condition, total time to charge a specific portion of the cell, for instance, time to charge from 20% state-of-charge (SOC) to 80% SOC, time to charge 0% SOC to 80% SOC, time to charge 0% SOC to 100% SOC, under a standard charging protocol.

4. The method of claim 1, wherein the one or more operating parameters comprise at least one of minimum voltage, maximum voltage, maximum charge rate, maximum discharge rate, and pressure applied to the cell or groups of cells, and a target temperature range for an active cooling system associated with the battery pack.

5. The method of claim 1, wherein assessing the state-of-health (SOH) comprises calculating the state-of-health (SOH) using one or more state-of-health (SOH) models.

6. The method of claim 5, further comprising configuring at least one state-of-health (SOH) model based on a physics-based model associated with at least one lithium-ion cell, and wherein the physics-based model comprises information relating to modeling of one or more physical phenomena as factors that reduce the SOH.

7. The method of claim 6, further comprising modeling the one or more physical phenomena as a function of one or more of local current density, voltage, lithium-ion concentration, temperature, pressure, electric field throughout the at least one lithium-ion cell, and physical material properties of materials in the at least one lithium-ion cell.

8. The method of claim 5, further comprising configuring at least one state-of-health (SOH) model based on a machine-learning (ML) model.

9. The method of claim 8, further comprising training the machine-learning (ML) model using one or more machine-learning (ML) algorithms comprising at least one of linear regression, logistic regression, nonlinear regression, decision tree ensemble methods, neural networks, recurrent neural networks, long-short-term memory networks, multi-layer perceptrons, Gaussian process algorithms, Bayesian algorithms, support vector regression, K-nearest-neighbors regression, and graph neutral networks.

10. The method of claim 8, further comprising training the machine-learning (ML) model using training data.

11. The method of claim 10, wherein the training data comprises one or more data features comprising at least one of cumulative capacity, cumulative energy, average rate, average temperature, maximum rate, minimum temperature, maximum temperature, cumulative capacity and/or energy binned by voltage, cumulative capacity and/or energy binned by rate, cumulative capacity and/or energy binned by temperature, statistical comparisons of voltage profiles throughout the life of the battery, curve fits of other quantitative calculations based on portions of voltage profiles, voltage, thickness, and impedance measurements acquired during the manufacture of the cell, features calculated based on the voltage profile of the cell during factory formation, the coulombic efficiency of the cell during formation, the minimum, maximum, or average temperature of the cell measured during formation.

12. The method of claim 5, further comprising configuring at least one state-of-health (SOH) model based on predicted useful life for at least one lithium-ion cell, and further comprising obtaining the predicted useful life is using a separate predictive model.

13. The method of claim 5, further comprising configuring at least one state-of-health (SOH) model using data related to or acquired during formation of at least one lithium-ion cell or fabrication of one or more components of at least one lithium-ion cell.

14. The method of claim 1, wherein the assessing of the state-of-health (SOH) comprises determining state-of-health (SOH) prediction for at least one lithium-ion cell; and wherein the controlling comprising determining at least one action based on the SOH prediction.

15. The method of claim 14, further comprising determining the state-of-health (SOH) prediction based on or using at least one of: deviation between a most recent state-of-health (SOH) calculation and state-of-health (SOH) measurement, changes to predicted useful life for the at least one lithium-ion cell, and reinforcement learning based modeling.

16. The method of claim 1, further comprising controlling the plurality of lithium-ion cells to maintain each of the plurality of lithium-ion cells within a predefined range of a tracked value at any given point in a life of the battery pack.

17. The method of claim 1, wherein the one or more operating parameters comprise discharge cutoff voltage, and wherein the controlling comprising modifying the discharge cutoff voltage for at least one lithium-ion cell balance the SOH of the plurality of lithium-ion cells.

18. A system comprising:
a plurality of lithium-ion cells; and
one or more circuits configured to:
assess state-of-health (SOH) of the plurality of lithium-ion cells; and
control, based on the assessing of state-of-health (SOH), the plurality of lithium-ion cells;
wherein the controlling comprises setting or modifying one or more operating parameters of at least one lithium-ion cell; and
wherein the controlling is configured to equilibrate the state-of-health (SOH) of the plurality of lithium-ion cells, so that state-of-health (SOH) values of all individual cells of the plurality of lithium-ion cells are closer to one another, or so that a state-of-health (SOH) value of each of the plurality of lithium-ion cells meets a same threshold criterion.

19. The system of claim 18, wherein each of the plurality of lithium-ion cells comprises a silicon-dominant cell comprising a silicon-dominant anode with silicon >50% of active material of the anode.

20. The system of claim 18, wherein the one or more circuits are configured to assess one or more of remaining useful life in units of energy, remaining useful life in units of capacity, discharge capacity under a standard measurement condition, energy density under a standard measurement condition, resistance under a standard measurement condition, total time to charge a specific portion of the cell, for instance, time to charge from 20% state-of-charge (SOC) to 80% SOC, time to charge 0% SOC to 80% SOC, time to charge 0% SOC to 100% SOC, under a standard charging protocol.

21. The system of claim 18, wherein the one or more circuits are configured to calculate the state-of-health (SOH) for at least one lithium-ion cell using one or more state-of-health (SOH) models.

22. The system of claim 21, wherein at least one state-of-health (SOH) model is based on a physics-based model associated with at least one lithium-ion cell, and wherein the physics-based model comprises information relating to modeling of one or more physical phenomena as factors that reduce the SOH, and wherein the one or more circuits are configured to model the one or more physical phenomena as a function of one or more of local current density, voltage, lithium-ion concentration, temperature, pressure, electric field throughout the at least one lithium-ion cell, and physical material properties of materials in the at least one lithium-ion cell.

23. The system of claim 21, wherein at least one state-of-health (SOH) model comprises a machine-learning (ML) based model, and wherein the one or more circuits are configured to train the machine-learning (ML) based model using one or more machine-learning (ML) algorithms comprising at least one of linear regression, logistic regression, nonlinear regression, decision tree ensemble methods, neural networks, recurrent neural networks, long-short-term memory networks, multilayer perceptrons, Gaussian process algorithms, Bayesian algorithms, support vector regression, K-nearest-neighbors regression, and graph neutral networks.

24. The system of claim 21, wherein at least one state-of-health (SOH) model comprises a machine-learning (ML) based model, and wherein the one or more circuits are configured to train the machine-learning (ML) based model using training data.

25. The system of claim 21, wherein the one or more circuits are configured to configure at least one state-of-health (SOH) model based on predicted useful life for at least one lithium-ion cell, and further comprising obtaining the predicted useful life is using a separate predictive model.

26. The system of claim 21, wherein the one or more circuits are configured to configure at least one state-of-health (SOH) model using data related to or acquired during formation of at least one lithium-ion cell or fabrication of one or more components of at least one lithium-ion cell.

27. The system of claim 18, wherein the one or more circuits are configured to, when assessing the state-of-health (SOH), determine state-of-health (SOH) prediction for at least one lithium-ion cell, and to determine at least one action based on the SOH prediction.

28. The system of claim 27, wherein the one or more circuits are configured to determine the state-of-health (SOH) prediction based on or using one or more of: deviation between a most recent state-of-health (SOH) calculation and state-of-health (SOH) measurement, changes to predicted useful life for the at least one lithium-ion cell, and reinforcement learning based modeling.

29. The system of claim 18, wherein the one or more circuits are configured to control the plurality of lithium-ion cells to maintain each of the plurality of lithium-ion cells within a predefined range of a tracked value at any given point in a life of a battery pack comprising the plurality of lithium-ion cells.

30. The system of claim 18, wherein the one or more operating parameters comprise discharge cutoff voltage, and wherein the one or more circuits are configured to modify the discharge cutoff voltage for at least one lithium-ion cell balance the SOH of the plurality of lithium-ion cells.

* * * * *